United States Patent
Ambs et al.

[19]

[11] Patent Number: 6,062,439
[45] Date of Patent: May 16, 2000

[54] ROTARY VALVE WITH IMPROVED SEALING MEANS

[75] Inventors: Richard W Ambs, Williamsport; Anthony Boroch, Montoursville; Galen S Ingram, Muncy; Curtiss F Wykoff, Hughesville, all of Pa.

[73] Assignee: Young Industries, Muncy, Pa.

[21] Appl. No.: 09/111,161

[22] Filed: Jul. 7, 1998

[51] Int. Cl.⁷ .................................................. G01F 11/10
[52] U.S. Cl. ........................ 222/368; 222/410; 414/219
[58] Field of Search ................... 222/368, 410, 222/340; 414/219, 220

[56] References Cited

U.S. PATENT DOCUMENTS

| | | | |
|---|---|---|---|
| 4,600,032 | 7/1986 | Heyl | 222/368 |
| 4,602,727 | 7/1986 | Jackson | 222/368 |
| 4,915,265 | 4/1990 | Heep et al. | 222/368 |
| 4,946,078 | 8/1990 | Heep et al. | 222/368 |
| 5,014,885 | 5/1991 | Heep et al. | 222/368 |
| 5,201,441 | 4/1993 | Hoppe et al. | 222/368 |
| 5,368,311 | 11/1994 | Heyl | 222/368 |
| 5,392,964 | 2/1995 | Stapp et al. | 222/368 |
| 5,480,268 | 1/1996 | Smoot | 222/368 |
| 5,630,691 | 5/1997 | Newbolt | 222/368 |

*Primary Examiner*—Kevin Shaver
*Assistant Examiner*—Keats Quinalty
*Attorney, Agent, or Firm*—Lalos & Keegan

[57] ABSTRACT

A rotary valve with a rotor shroud and a cylinder wall. The rotary valve is sealed by injecting a fluid to compress a packing seal into sealing engagement with the rotor shroud and the cylinder wall.

23 Claims, 1 Drawing Sheet

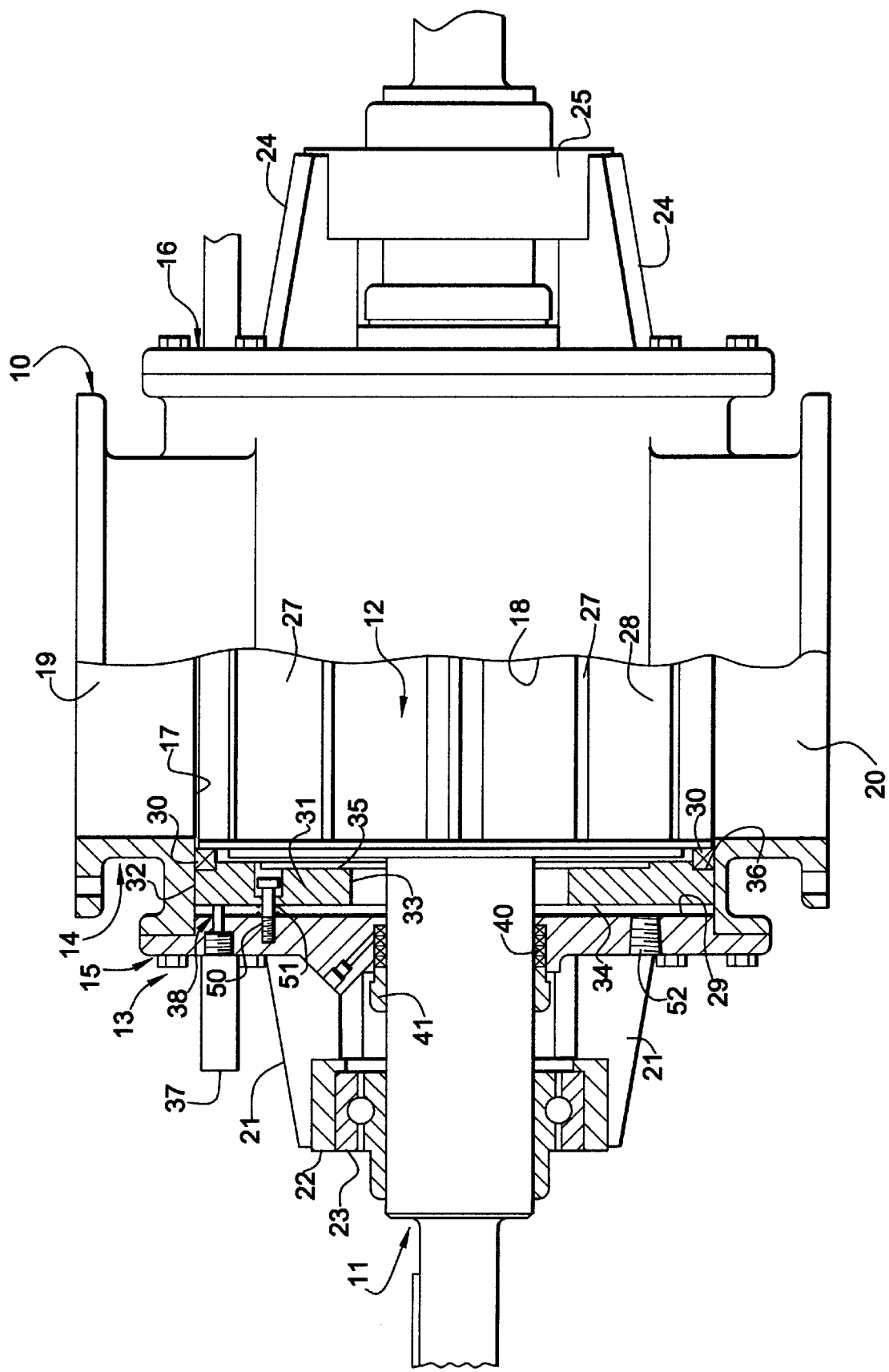

ROTARY VALVE WITH IMPROVED SEALING MEANS

This invention relates to rotary valves of a type typically used in pneumatic conveying systems and more particularly to such type of valves having improved sealing means.

BACKGROUND OF THE INVENTION

A type of rotary valve commonly used in pneumatic conveying systems for transporting comminuted materials typically consists of a housing having a chamber provided with a cylinder wall, an inlet for receiving comminuted material from a material holding vessel or the like communicating with the housing chamber, and an outlet also communicating with the housing chamber and communicable with a pneumatic conveying line or the like, and a pair of end walls closing the chamber, a shaft journaled in the end walls of the housing, and a rotor mounted on or formed integrally with the shaft within the housing chamber, having a pair of axially spaced shrouds and a plurality of radially projecting vanes between such shrouds providing a plurality of circumferentially spaced pockets adapted to receive material from the inlet, convey it through the rotor chamber and discharge it through the outlet. Since there normally exists a pressure differential across the rotor of such valves, leakage of conveying air and/or material being conveyed is apt to occur in the rotor chamber. To prevent such leakage, there usually is provided an annular packing seal engaging the periphery of each shroud of the rotor and the cylindrical wall of the chamber, a follower plate engaging such annular packing seal and means for urging the follower plate against the packing seal to enhance the sealing action of the packing seal.

In the earlier prior art, such means for urging the follower plate into engagement with the packing seal often has consisted of a number of circumferentially spaced adjustment screws threaded through openings in an adjacent end wall of the housing and engaging the follower plate. A disadvantage of such end seal assemblies utilizing adjustment screws has been that they require a uniform threading of such screws in order to provide a uniform application of force of the follower plate on the annular packing seal. Otherwise, the packing seal engaging the rotor shroud would wear unevenly, requiring frequent replacement.

The problem of applying a nonuniform force on such follower plates by the use of adjustment screws has somewhat been overcome by the use of fluid pressure for urging the follower plate against the packing seal to correspondingly compress the seal against the peripheral portion of the rotor shroud and the adjacent cylindrical wall of the rotor chamber. Examples of such type of end seal assemblies are illustrated and described in U.S. Pat. Nos. 4,915,265, and 4,946,078.

While prior art end seal assemblies for rotary valves utilizing fluid pressure has been an improvement over the use of adjustment screws for displacing the follower plate in such type of valves, such assemblies have not been found to be entirely satisfactorily in providing effective sealing of the rotors. It thus is the principal object of this invention to provide a rotary valve of the type described having an improved end seal which is comparatively simple in design, effective in service and easy to disassemble and reassemble.

SUMMARY OF THE INVENTION

The present invention generally provides for a rotary valve including a housing having a chamber provided with a cylindrical wall, inlet and outlet openings communicating with such chamber and a pair of end walls closing such chamber, a shaft extending into such chamber and journaled in at least one of the end walls and a rotor mounted on the shaft within the chamber, having at least one shroud spaced from one of the end walls and cooperating with the end wall, a portion of the cylindrical wall of the housing and the shaft to provide an annular chamber, and a plurality of circumferentially spaced pockets relative to the axis of the shaft, communicable with the inlet and outlet openings of the housing as the shaft is rotated. The valve further includes an annular follower plate disposed in the annular chamber with the shaft extending therethrough, and displaceable axially, an annular packing seal mounted on the follower plate and engageable with the rotor shroud and the cylindrical wall of the annular chamber upon axial displacement of the follower plate, and at least two fluid actuated cylinders mounted on the end wall, spaced circumferentially relative to the axis of the shaft and having piston rods extendable into engagement with the follower plate for displacing the follower plate toward the rotor shroud and, correspondingly, compressing the packing seal into sealing engagement with the rotor shroud and the cylindrical wall of the housing. Means are provided for supplying fluid under pressure to the fluid actuated cylinders and, preferably, further means are provided for controlling the pressure of fluid supplied to the cylinders and thus correspondingly controlling the sealing force applied by the follower plate on the packing seals. Optionally, additional means are provided for supplying air under pressure to the annular chamber for purging any processing air or material being processed apt to flow between the periphery of the rotor shroud and the cylindrical wall of the housing during operation of the valve.

DESCRIPTION OF THE DRAWING

The single FIGURE shown in the accompanying drawing is a side elevational view of a rotary valve embodying the present invention, illustrating a portion thereof in vertical cross section.

DESCRIPTION OF THE PREFERRED EMBODIMENT OF THE INVENTION

Referring to the drawing, there is illustrated a rotary valve which generally includes a housing 10, a shaft 11 journaled in the housing, a rotor 12 mounted on the shaft within the housing and a pair end seal assemblies 13,13 each disposed between the rotor and the housing. Housing 10 includes a main body portion 14 and pair of end walls 15 and 16. The main body portion of the housing includes an inner cylindrical wall 17 which cooperates with end walls 15 and 16 to provide a rotor chamber 18. The main housing body portion further is provided with an inlet 19 communicating with the chamber and an outlet opening 20 displaced 180° from inlet opening 19, relative to the axis of the rotor chamber, also communicating with the rotor chamber. Provided on the side of housing in wall 15 is a plurality of circumferentially spaced arms 21 which support a bearing housing 22 disposed axially relative to the rotor chamber. Disposed in housing 22 is conventional ball bearing 23. Housing end wall 16 similarly is provided with a set of circumferentially spaced arm members 24 supporting a bearing housing 25 in which there is mounted a ball bearing similar to bearing 23.

Rotor 12 consists of a pair of axially spaced, annular shrouds 26 and a plurality of circumferentially spaced, radially disposed vanes 27 providing a plurality of pockets 28 communicable with the inlet and outlet openings in the housing as the rotor is rotated on the shaft for receiving comminuted material gravity fed or fed under pressure through inlet opening 19, conveying such material through the valve and discharging the material through outlet opening 20, usually into a pneumatic conveying line. The spacing between the rotor shrouds is slightly greater than the longitudinal dimensions of the inlet and outlet openings, and the diameter of the rotor shrouds is slightly less than the diameter of cylindrical wall 17. Because of a pressure differential across the rotor, the annular spaces between the peripheries of the rotor shrouds and cylindrical wall 17 must be sealed. Otherwise, conveying air and material being conveyed through the valve will be caused to leak about the peripheries of the rotor shrouds.

The spacing between the inner faces of housing end walls 15 and 16 is greater than the spacing between rotor shrouds 26,26 to provide a pair of annular chamber portions 29,29. As shown in the drawing, an end seal assembly 13 disposed on one side of the rotor includes a packing seal 30 and a follower plate 31. The follower plate has an annular configuration with an outer diameter slightly less than the diameter of cylindrical wall surface 17 to permit axial displacement of the follower plate, an inner annular surface 33 having a diameter greater than the diameter of shaft 11 to provide an annular space therebetween, and a thickness less than the axial dimension of chamber portion 29. The follower plate further is provided with planar end surfaces 34 and 35 which oppose an end wall and a rotor shroud, respectively. The peripheral portion of end surface 35 is provided with an annular recess 36 in which there is seated annular packing seal 30. The annular packing seal is adapted to engage both the peripheral portion of rotor shroud 26 and a portion of cylindrical wall surface 17 to seal the space therebetween.

Packing seal 30 may be caused to be compressed axially and radially by means of a set of air actuated cylinders 37 mounted on end wall 15 and circumferentially spaced relative to the axis of shaft 11. The air cylinders are provided with piston rods 38 which are adapted to be extended into engagement with follower plate 31 to axially displace the follower plate and thus compress packing seal 30 to form a seal between the inner peripheral surface of the follower plate and both the outer peripheral surface of rotor shroud 26 and cylindrical housing wall surface 17. The base ends of the air cylinders are connected through a set of fluid lines to a supply of air under pressure, which are provided with suitable controls for varying the amount of pressure supplied to the cylinders and, correspondingly, the force applied on the follower plate. By varying the amount of air supplied to the air cylinders, the force supplied on the follower plate and correspondingly the compressive force applied by the follower plate on the packing seal, may be varied.

When the rotor is rotating and the follower is displaced axially to press seal 30 against the rotating rotor, rotation of the follower plate is prevented by a set of bolts 50 mounted on the follower plate, spaced circumferentially relative to the axis of shaft 11 and threaded into openings provided in housing end wall 15. Each of the openings in the follower plate in which a restraining bolt is disposed, includes a counterbored portion accommodating the head portion of the bolt disposed therein, thus permitting limited axial displacement of the follower plate while precluding rotation thereof. Mounted on each of such bolts and interposed between end wall 15 and follower plate 31 is a coil spring 51 which functions to exert a small force on the follower plate and thus maintain packing seal 30 in constant engagement with the rotor shroud.

When the valve is not being operated, coil springs 51 function to apply a sufficient pressure on the follower plate to urge packing seal 30 into engagement with the rotor shroud and the cylindrical housing wall to provide a minimal sealing action. When the valve begins to operate, air under pressure is supplied to air cylinders 37 to axially displace the follower plate and thus further compress packing seal 30 and correspondingly increase the sealing action. The amount of sealing action can be controlled by controlling the supply of air under pressure to the air cylinders. Preferably, the seal between packing seal 30 and the end face of the rotor shroud is not made fluid tight so that air under pressure introduced into annular chamber 29 through an inlet 52 will be permitted to leak between the packing seal and the end face of the rotor shroud and this clear the space between the periphery of the shroud and the adjacent cylindrical housing wall of material particles. Depending on the nature of the material being conveyed through the valve, the pressure differential across the rotor of the valve and the speed of the rotor shaft, the pressure applied by the air cylinders on the follower plate and correspondingly the sealing action between the packing seal and the rotor shroud and the pressure of the purging air introduced through inlet 52 may be varied to provide a desired sealing and purging action to accommodate the material being processed. When the operation of the valve is to be discontinued, the supply of fluid under pressure to the air cylinders is discontinued, thus removing the force applied to the follower plate and correspondingly diminishing the sealing action between the packing seal and the rotor shroud, while continuing to supply purging air through inlet 52 to continue to purge conveying air and conveyed material from the area between the periphery of the rotor shroud and the cylindrical housing wall until the operation of the valve has been completely stopped. When the operation of the valve has been stopped, the supply of purging air may be discontinued, thus permitting the follower plate to cause packing seal 30 to engage the rotor shroud under the biasing action of the coil springs.

Sealing between end wall 15 and shaft 11 is provided in the conventional manner by means of a set of packing rings 40 disposed in an enlarged portion of the shaft opening in end wall 15, compressed and expanded radially in sealing engagement with the end wall and the rotating shaft by means of a follower member 41.

The valve as described may be disassembled for routine maintenance or other purposes simply by first loosening the shaft clamping means of bearing 23, backing off packing follower 41, unbolting end wall 15 from housing 10 and then sliding the end wall along with the attached follower plate and shaft packing rings from the shaft. Packing seal 30 may then be easily removed and replaced and other service functions may be performed as required. Replacement of packing seal 30 is facilitated by the provision of recess 36 in that upon removal of a worn seal, the replacement seal may be easily fitted into the recess around the periphery of the follower plate thus facilitating its installation. With the end wall thus removed, if the rotor is simply keyed rather than welded to the shaft, it also may be removed simply by sliding it out of the housing along the shaft. The rotor may then be cleaned and reinstalled by sliding it back on the shaft into the rotor chamber. The valve may then be reassembled simply by replacing the end wall with the attached follower plate and packing seal, bolting it to the main housing portion and then replacing bearing 23. The opposite end of the valve may be disassembled and reassembled in essentially the same manner to remove and replace the packing seal on the other rotor shroud or otherwise obtain access to the other end of the valve for routine maintenance or other purposes.

The housing of the valve including the end walls thereof may be formed of any suitable material by casting or fabrication, with suitable machining. The shaft preferably is formed of steel and the rotor may be formed of a metal such as steel, aluminum or a suitable alloy, or a suitable plastic material such as nylon. The follower plate also may be formed of a metal or a plastic. The packing seals may be formed of any commercially available sealing material usually a fibrous material, and preferably is provided with a solid lubricant additive or coating such as polytetrafluoroethylene (PTFE).

From the foregoing detailed description it will be evident that there are a number of changes, adaptations and modifications of the present invention which come within the province of those persons having ordinary skill in the art to which the aforementioned invention pertains. However, it is intended that all such variation not departing from the spirit of the invention be considered as within the scope thereof as limited solely by the appended claims.

We claim:

1. A rotary valve comprising:
   a housing having a chamber provided with a cylindrical wall, inlet and outlet openings communicating with said chamber and a pair of end walls closing said chamber;
   a shaft extending into said chamber and journaled in at least one of said end walls;
   a rotor mounted on said shaft within said chamber, having at least one shroud spaced from one of said end walls and cooperating with said end wall, a portion of said cylindrical wall and said shaft to provide an annular chamber, and plurality of circumferentially spaced pockets relative to the axis of said shaft, communicable with said inlet and outlet openings as said shaft is rotated;
   an annular follower plate disposed in said annular chamber with said shaft extending therethrough and displaceable axially;
   an annular packing seal mounted on said follower plate and engageable with said rotor shroud and said cylindrical wall of said annular chamber upon axial displacement of said follower plate; and
   at least two fluid actuated cylinders mounted on said end wall, spaced circumferentially relative to the axis of said shaft and having piston rods extendible into engagement with said follower plate for displacing said follower plate toward said rotor shroud and, correspondingly, compressing said seal into sealing engagement with said rotor shroud and said cylindrical wall.

2. A rotary valve according to claim 1 including means for supplying fluid under pressure to said cylinders.

3. A rotary valve according to claim 2 wherein said fluid supplying means includes means for controlling the pressure of fluid supplied to said cylinders and thus controlling the sealing force applied by said follower plate.

4. A rotary valve according to claim 1 including means apart from said cylinders for applying a constant force on said follower plate, urging said follower plate towards said rotor shroud and, correspondingly, said annular packing seal into sealing engagement with said rotor shroud.

5. A rotary valve according to claim 4 wherein the force applied by said constant force applying means is less than the force capable of being applied by said fluid actuated cylinders.

6. A rotary valve according to claim 1 wherein said annular packing seal is secured to said follower plate.

7. A rotary valve according to claim 1 wherein said follower plate is provided with an annular recess and said annular packing seal is seated in said recess.

8. A rotary valve according to claim 7 wherein said recess is disposed about an outer periphery of said outer plate.

9. A rotary valve according to claim 1 including means for precluding rotation of said follower plate when said rotor is rotating, said follower plate is axially displaceable toward said rotor shroud and said annular packing seal engages said rotor shroud.

10. A rotary valve according to claim 9 wherein said rotation precluding means includes at least one member secured to said housing and projecting through an opening in said follower plate, disposed parallel to the axis of such shaft, permitting axial displacement of said follower plate relative to said end wall while precluding rotational movement thereof relative to said axis.

11. A rotary valve according to claim 10 wherein said rotation precluding means comprises a bolt projected through and opening in said follower plate and threaded into a threaded opening in said end wall.

12. A rotary valve according to claim 11 wherein said bolt includes a shank portion extending through said opening in said follower plate and a head portion disposed in an enlarged section of said opening.

13. A rotary valve according to claim 10 including a coil spring interposed between said end wall and said follower plate and receiving said rotation precluding means therethrough, operable to provide a constant biasing force on said follower plate in urging said annular packing seal into engagement with said rotor shroud.

14. A rotary valve according to claim 1 including means for injecting a fluid under pressure into said annular chamber for purging material being processed through said valve, through any passageway disposed between said rotor shroud and said cylindrical housing wall.

15. A rotary valve according to claim 1 including biasing means operable to provide a constant force on said follower plate urging said annular packing seal into engagement with said rotor shroud, means for supplying a fluid under controlled pressure to said fluid actuated cylinders and means for injecting a purging fluid under controlled pressure into said annular chamber.

16. A rotary valve according to claim 15 wherein the force available to be applied by said fluid cylinders on said follower plate is greater than the force applied by said biasing means thereof.

17. A rotary valve according to claim 15 wherein the pressure of said purging fluid is greater than the pressure applied to the material processed through said valve.

18. A rotary valve according to claim 15 wherein the speed of said shaft may be regulated.

19. A rotary shaft according to claim 15 wherein the speed of said shaft, the fluid pressure applied to said fluid actuated cylinders and the pressure of said purging fluid are adjustable to accommodate the nature of the material being processed through the valve and the pressure of the processing fluid, to preclude leakage of processing fluid and processed material into said annular chamber.

20. A rotary valve according to claim 1 wherein said follower plate is formed of a plastic material.

21. A rotary valve according to claim 1 wherein said annular packing seal is formed wear resistant material.

22. A rotary valve according to claim 1 wherein said follower plate is formed of nylon and said annular seal is formed of a fibrous material provided with a solid lubricating additive.

23. A rotary valve according to claim 22 wherein said additive is polytetrafluoroethylene.

* * * * *